United States Patent [19]
Kawasaki et al.

[11] Patent Number: 5,344,569
[45] Date of Patent: Sep. 6, 1994

[54] PROCESS FOR RECOVERING THIOCYANATE

[75] Inventors: Shiro Kawasaki; Noriyuki Kohara, both of Okayama, Japan

[73] Assignee: Japan Exlan Company Limited, Osaka, Japan

[21] Appl. No.: 133,343

[22] Filed: Oct. 8, 1993

[30] Foreign Application Priority Data
Nov. 19, 1992 [JP] Japan .................. 4-335513

[51] Int. Cl.$^5$ .............................. B01D 61/00
[52] U.S. Cl. .................. 210/653; 210/650; 210/651
[58] Field of Search ............ 210/652, 651, 653, 654, 210/908, 911, 688, 500.23, 500.38, 650

[56] References Cited

U.S. PATENT DOCUMENTS

| | | |
|---|---|---|
| 4,079,000 | 3/1978 | Osaki et al. .................. 210/656 |
| 4,938,872 | 7/1990 | Strantz, Jr. et al. .......... 210/500.38 |
| 5,116,507 | 5/1992 | Ebbins et al. ................. 210/652 |

FOREIGN PATENT DOCUMENTS

| | | |
|---|---|---|
| 0465968 | 1/1992 | European Pat. Off. . |
| 0556003 | 8/1993 | European Pat. Off. . |
| 61-64391 | 4/1986 | Japan . |

OTHER PUBLICATIONS

European Search Report dated Mar. 11, 1994.

Primary Examiner—Robert A. Dawson
Assistant Examiner—Ana M. Fortuna
Attorney, Agent, or Firm—Armstrong, Westerman, Hattori, McLeland & Naughton

[57] ABSTRACT

A safe, energy-Saving process for recovering (or purifying) thiocyanate from a large amount of waste liquid (or thiocyanate-containing aqueous solution) by the aid of a reverse osmosis membrane whose sodium chloride rejection is from 10% to 70%. The process performs recovery without decreasing the concentration of thiocyanate in feed.

3 Claims, 1 Drawing Sheet

PROCESS FOR RECOVERING THIOCYANATE

The present invention relates to a process for recovering thiocyanate from a thiocyanate-containing aqueous solution by filtration through a reverse osmosis membrane.

Waste liquid arising from desulfurization of coke oven gas contains ammonium thiocyanate, ammonium thiosulfate, ammonium sulfate, colored components (such as picric acid), tar, and solids. It is an inevitable by-product in coke production, and it cannot be discarded as such. Therefore, it needs adequate treatment for disposal, which involves the separation and recovery of thiocyanate as a useful material.

There are several known processes of separating and recovering ammonium thiocyanate from waste liquid arising from desulfurization of coke oven gas. They include the one which utilizes the difference of solubility (Japanese Patent Laid-open Nos. 7825/1982, 25699/1973, and 17421/1982), the one which utilizes an organic polar solvent which selectively extracts ammonium thiocyanate (Japanese Patent Laid-open No. 26699/1973), and the one which re-sorts to distillation under reduced pressure (Japanese Patent Laid-open Nos. 75489/1974 and 58000/1975).

Also, there is a known process for separating and recovering thiocyanate from a thiocyanate-containing aqueous solution. It utilizes gel filtration by the aid of a polymeric gel for separation (Japanese Patent Laid-open Nos. 106494/1974, 38695/1975, and 139600/1976).

According to the process disclosed in Japanese Patent Laid-open No. 26699/1973, waste liquid arising from treatment of coal carbonization gas is discolored by activated carbon, with or without pretreatment for the removal of precipitates by stirring with hot air and then evaporated to dryness, and the residues are extracted with an organic polar solvent which selectively dissolves ammonium thiocyanate. Example 1 in it indicates that precipitates to be removed by stirring with hot air are mostly sulfur.

According to the process disclosed in Japanese Patent Laid-open Nos. 7625/1982 and 17421/1982, waste liquid arising from desulfurization of coke oven gas is discolored and then oxidized by blowing oxygen at lower than 200° C. while keeping the waste liquid slightly acidic or alkaline. It is claimed that the process yields a solution in which substantially all of ammonium thiosulfate is converted into ammonium sulfate and ammonium thiocyanate remains intact. It is also claimed that the solubility of ammonium sulfate dissolves in the mixed solution of ammonium sulfate and ammonium thiocyanate is by far lower than that in water but the solubility of ammonium thiocyanate in the mixed solution does not greatly differ from that in water, and hence it is possible to separate ammonium sulfate by crystallization and to recover ammonium thiocyanate from the filtrate.

The separation of thiocyanate by gel filtration varies from one process to another. The one disclosed in Japanese Patent Laid-open No. 106494/1974 consists of supplying an impure aqueous solution of thiocyanate to a layer of crosslinked dextran, thereby causing it to capture impurities and thiocyanate, and eluting impurities and then thiocyanate.

The process disclosed in Japanese Patent Laid-open No. 38695/1975 employs crosslinked dextran to separate thiocyanate from its aqueous solution, like the aforesaid process, but it differs in that the first eluate is a solution containing a salt of oxygen acid of inorganic sulfur and the second eluate (before the elution of a colored solution) is a thiocyanate-containing solution. The process also involves treatment with activated carbon prior to gel filtration.

The process disclosed in Japanese Patent Laid-open No. 139600/1976 employs a crosslinked polymer of acrylamide or a derivative thereof for gel filtration.

The above-mentioned conventional processes suffer their respective disadvantages. The process that utilizes the solubility difference needs a large amount of energy for cooling. The process that resorts to solvent extraction also needs a large amount of energy for solvent distillation. The process that resorts to distillation under reduced pressure needs a large amount energy and gives off toxic thiocyanate gas, although it yields a pure thiocyanate. The process that employs gel filtration needs a step for the concentration of eluate, although it yields a pure thiocyanate.

BRIEF SUMMARY OF THE INVENTION

The present invention was completed to address the above-mentioned problems. It is an object of the present invention to provide a process for recovering thiocyanate in a safe manner with a less amount of energy from a large amount of waste liquid.

DETAILED DESCRIPTION

Figure 1:
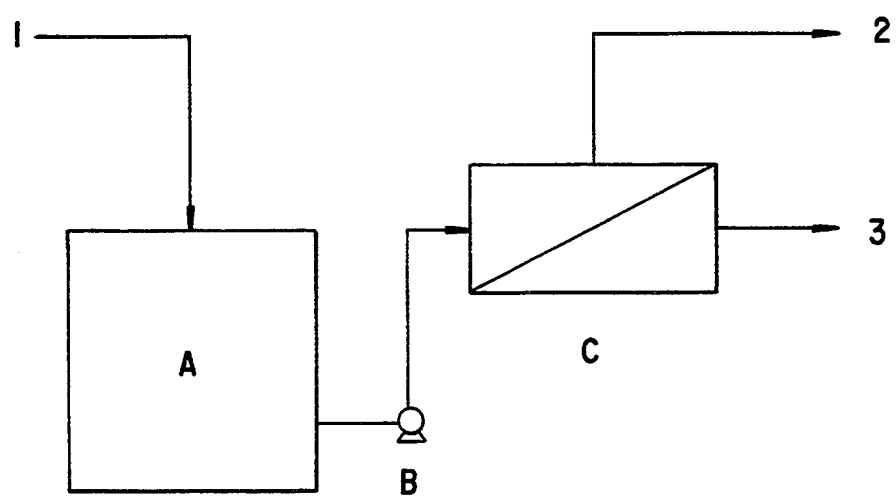
FIG. 1 is a flowchart illustrating an embodiment of the process of the invention.

The present invention is based on the finding that thiocyanate permeates through a membrane greatly differently from coexisting impurities and hence it is possible to selectively recover a thiocyanate by the aid of a reverse osmosis membrane if the membrane, waste liquid, and operating conditions are properly selected.

The present invention is embodied in a process for recovering thiocyanate from a thiocyanate-containing aqueous solution, said process comprising filtering the solution through a polymeric reverse osmosis membrane whose sodium chloride rejection is from 10% to 70%.

A detailed description of the invention follows.

Typical examples of the thiocyanate-containing aqueous solution include waste liquid arising from desulfurization of coke oven gas and its concentrate. It takes on a dark red color and contains ammonium thiocyanate, ammonium thiosulfate, ammonium sulfate, colored components (such as picric acid), tar, and solids. Their content greatly varies as shown below.

Ammonium thiocyanate 20–30 wt. %
Ammonium thiosulfate 5–25 wt. %
Ammonium sulfate 3–10 wt. %
Colored components 0.01–1 wt. %
Tar 0.01–1 wt. %
Solids 2–10 wt. %
Water 40–60 wt. %

Some manufacturing process may yield sodium salts in place of ammonium salts.

Needless to say, the process of the present invention may be applied not only to waste liquid arising from desulfurization of coke oven gas but also to any thiocyanate-containing aqueous solution. An example of the latter is an aqueous solution recovered from the solvent used for the spinning of acrylonitrile polymer.

The polymeric reverse osmosis membrane used in the present invention should be one which whose sodium chloride rejection is from 10% to 70%, preferably from 30% to 60%. With lower than 10%, the membrane permits ammonium thiosulfate and ammonium sulfate and low-molecular-weight colored components to permeate, with the result that the recovered thiocyanate has a low purity. With higher than 70%, the membrane needs a high pressure if a large amount of liquid is to be filtered. Moreover, it prevents the passage of impurities as well as thiocyanate (to be recovered), with the result that the filtrate has a low concentration of thiocyanate. There are no restrictions on the material of the reverse osmosis membrane so long as the above-mentioned requirements are satisfied. Examples of the material include polyolefin, polysulfone, polyamide, and acetylcellulose.

Incidentally, the sodium chloride rejection of the reverse osmosis membrane is measured under the condition that a 0.2% aqueous solution of sodium chloride permeates under a pressure of 10 kg/cm$^2$ until 30% of it is recovered.

The operation may be carried out under the conditions recommended by the manufacturer for the particular reverse osmosis membrane. In practical operation, the pressure and flow rate should preferably be 2–20 kg/cm$^2$ and 2–60 L/m$^2$-hr, respectively. Although waste liquid needs no pretreatment, its temperature and pH should be properly adjusted to the reverse osmosis membrane. Further, when the waste liquid contains foreign matter it is sometimes necessary to remove the same by filtration.

The permeability of ions through a polymer membrane is determined by the chemical potential of the particular ions in structureless water (having its structure disordered by the membrane material). The lower the chemical potential, the higher the permeability. The order of chemical potential coincides with the lyotropic series, and thiocyanate ions are at the lowest. Therefore, thiocyanate is stabler than other salts in structureless water. This is the reason why thiocyanate can be separated from less permeable impurities and recovered without appreciable decrease in concentration in the filtrate.

The invention will be more clearly understood with reference to the following examples; however, they are intended to illustrate the invention and are not to be construed to limit the scope of the invention.

EXAMPLE 1

Recovery of ammonium thiocyanate was carried out according to the flowsheet shown in FIG. 1, in which there are shown a feed tank A, a feed pump B, and a reverse osmosis membrane module C. Feed is admitted through 1, concentrated solution is discharged from 2, and filtrate (product) is discharged from 3.

Feed is waste liquid arising from desulfurization coke oven gas which has been filtered through a 5-μm cartridge filter. It contains 23.2% ammonium thiocyanate, 7.0% ammonium thiosulfate, and 3.6% ammonium sulfate, and has pH 7.3. The reverse osmosis membrane module is NTR-7250 made by Nitto Denko Corporation (equipped with a polyamide membrane whose sodium chloride rejection is 60%). Filtration is performed under a pressure of 15 kg/cm$^2$. The resulting filtrate was found to contain 23.1% ammonium thiocyanate, 0.35% ammonium thiosulfate, and 0.18% ammonium sulfate. Thus, thiocyanate was separated from impurities and recovered with almost no decrease in concentration.

EXAMPLE 2

The same procedure as in Example 1 was repeated except that NTR-7250 was replaced by NTR-1550 made by Nitto Denko (equipped with a cellulose acetate membrane whose sodium chloride rejection is 50%) and the operating pressure was changed to 20 kg/cm$^2$. The resulting filtrate was found to contain 23.0% ammonium thiocyanate, 0.30% ammonium thiosulfate, and 0.10% ammonium sulfate. This result proves the effective recovery of thiocyanate.

EXAMPLE 3

The same procedure as in Example 1 was repeated except that NTR-7250 was replaced by NTR-7410 made by Nitto Denko (equipped with a polyamide membrane whose sodium chloride rejection is 10%) and the operating pressure was changed to 10 kg/cm$^2$. The resulting filtrate was found to contain 23.2% ammonium thiocyanate, 3.6% ammonium thiosulfate, and 2.0% ammonium sulfate. This result proves the recovery of thiocyanate without decrease in concentration, although the concentrations of impurities in the filtrate do not decrease as desired.

EXAMPLE 4

The same procedure as in Example 1 was repeated except that the feed was replaced by an aqueous solution recovered in the spinning of acrylic fiber. It contains 17.9% sodium thiocyanate, 0.3% sodium sulfate, 0.3% sodium chloride, and 0.4% sodium nitrate. The resulting filtrate was found to contain 17.9% sodium thiocyanate, 0.1% sodium chloride, 0.2% sodium nitrate, and none of sodium sulfate. This result proves the effective recovery of thiocyanate without decrease in concentration.

COMPARATIVE EXAMPLE 1

The same procedure as in Example 1 was repeated except that NTR-7250 was replaced by NTR-1698 made by Nitto Denko (equipped with an acetyl cellulose membrane whose sodium chloride rejection is 98%) and the operating pressure was changed to 35 kg/cm$^2$. No filtrate was obtained.

COMPARATIVE EXAMPLE 2

The same procedure as in Example 1 was repeated except that NTR-7250 was replaced by SC-L100R made by Toray Industries Inc. (equipped with an acetyl cellulose membrane whose sodium chloride rejection is 85%). It was found that the concentration of ammonium thiocyanate in the filtrate was 10.2%. This concentration is too low for the recovery process to be practicable.

COMPARATIVE EXAMPLE 3

The same procedure as in Example 4 was repeated except that NTR-7250 was replaced by NTU-3508 made by Nitto Denko (equipped with a polysulfone membrane whose sodium chloride rejection is 7% and whose fractionation molecular weight is 8000) and the operating pressure was changed to 2 kg/cm$^2$. The filtrate was found to contain sodium thiocyanate, sodium sulfate, sodium chloride, and sodium nitrate in the same concentrations as in the feed. In other words, the recovery of thiocyanate did not take place at all.

As mentioned above, the process of the present invention employs a specific reverse osmosis membrane for the selective recovery of thiocyanate from a thiocyanate-containing aqueous solution (as feed). Therefore, it permits the desired thiocyanate to be selectively recovered without decrease in concentration. This eliminates the necessity of concentrating the filtrate, which leads to energy saving. In addition, it gives rise to no toxic gas detrimental to environment and health. It is easy to practice on an industrial scale for the recovery of thiocyanate from waste liquid arising from desulfurization of coke oven gas and from the solution for spinning of acrylic fiber. By virtue of these advantages, the present invention is of great industrial importance.

FIG. 1 is a flowsheet of one embodiment of the present invention. Feed (1) is admitted to the feed tank (A) and then introduced under pressure to the reverse osmosis membrane module (C) by means of the feed pump (B). The concentrated liquid (2) and filtrate (3) are discharged for further processing.

What is claimed is:

1. A process for recovering thiocyanate from a thiocyanate-containing aqueous solution, said process comprising filtering the solution through a polymeric reverse osmosis membrane having a sodium chloride rejection rate of 10% to 70%, whereby a filtrate is obtained which contains essentially all of the thiocyanate from said solution.

2. The process as defined in claim 1, wherein the thiocyanate-containing aqueous solution is waste liquid from desulfurization of coke oven gas or a concentrate of said waste liquid.

3. The process as defined in claim 1, wherein the thiocyanate-containing aqueous solution is a thiocyanate aqueous solution recovered after the spinning of acrylonitrile polymer.

* * * * *